April 9, 1929.    L. SAX    1,708,802

TAP

Filed Dec. 9, 1924

INVENTOR,
Laurence Sax;
BY Blakeslee & Brown
ATTORNEYS

Patented Apr. 9, 1929.

1,708,802

UNITED STATES PATENT OFFICE.

LAURENCE SAX, OF LOS ANGELES, CALIFORNIA, ASSIGNOR TO PENN LEATHER COMPANY, OF PHILADELPHIA, PENNSYLVANIA, A CORPORATION OF PENNSYLVANIA.

TAP.

Application filed December 9, 1924. Serial No. 754,731.

This invention relates to soles or taps and has for an object the provision of a sole or tap which is so formed as to be adaptable for either right or left footwear.

At the present time soles or taps are made either for the right shoe or boot or for a left shoe, and an object of the present invention is to do away with the necessity of providing individual tap members for respective shoes. The advantage of having a universal form of tap may be appreciated as one of the taps might be lost.

Figure 1:
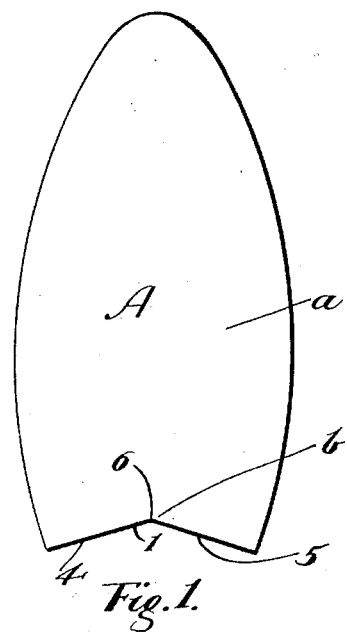
Figure 1 illustrates a tap in the form in which it is sent to users.
Figure 2:
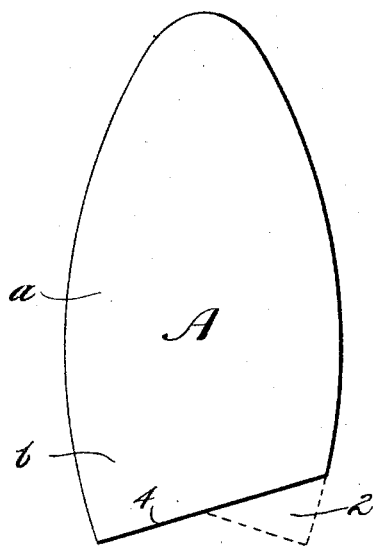
Figures 2 and 3 show how a mere cutting of the shank portion of the tap will provide either a left or right tap.
Figure 3:
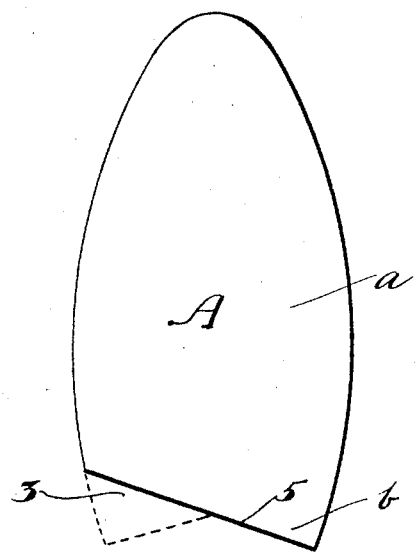

Referring to the drawing, I have designated the improved tap or sole by A, and it is to be noted that the body portion $a$ is generally symmetrical with respect to a longitudinal center line through the said tap or sole, and that the shank portion $b$ is given a V-shaped cut as illustrated at 1. To form the left foot tap it is only necessary to cut away that portion indicated in dotted lines in Figure 2 at 2, or, to form a right foot tap it is only necessary to cut away that portion of the shank shown at 3 in Figure 3. In other words, if one or the other of the sides 4 and 5 of the V-shaped cut is extended from where they intersect as shown at 6, either a right or left tap results.

Having thus disclosed my invention, I claim and desire to secure by Letters Patent:

1. The improved method of making tapsoles, half soles and the like, for use in the manufacturing and repairing of boots and shoes, which consists in forming the tapsole with outer edges along the forepart suitable for both right and left outer edges of a shoe, and cutting the tapsole adjacent the shank portion partly on the line for a right shoe and partly on a line for a left shoe.

2. As an improved article of manufacture, a leather tapsole, half sole or the like, comprising a forepart and toe portion with contour suitable for the outer edges of either right or left shoe and with the shank portion formed partly on the diagonal lines of both right and left shoe constructions.

In testimony whereof, I have signed my name to this specification.

LAURENCE SAX.